Feb. 12, 1957  E. WIEDEMANN  2,780,955
OPTICAL ARRANGEMENT FOR THE REPRODUCTION
OF REFRACTIVE INDEX GRADIENTS
Filed Jan. 8, 1953

INVENTOR
E. WIEDEMANN
BY Wenderoth, Lind and Ponack
ATTORNEYS

United States Patent Office 2,780,955
Patented Feb. 12, 1957

2,780,955

OPTICAL ARRANGEMENT FOR THE REPRODUCTION OF REFRACTIVE INDEX GRADIENTS

Erwin Wiedemann, Riehen, near Basel, Switzerland, assignor, by mesne assignments, to Saul & Co., Newark, N. J., as nominee of Fidelity Union Trust Company Application January 8, 1953, Serial No. 330,199

Claims priority, application Switzerland January 10, 1952

1 Claim. (Cl. 88—14)

The present invention relates to an optical system for recording changes in refractive index gradients according to the different variants of the Toepler principle (line, shadow and wire diagram), which system is at the same time suitable for interferometric measurements of refractive index gradients according to the Rayleigh principle, the system being such that, with objects as high as 65 mm., the overall optical length of the system from the light source to the recording screen does not exceed 2500 mm.

Figure 1:
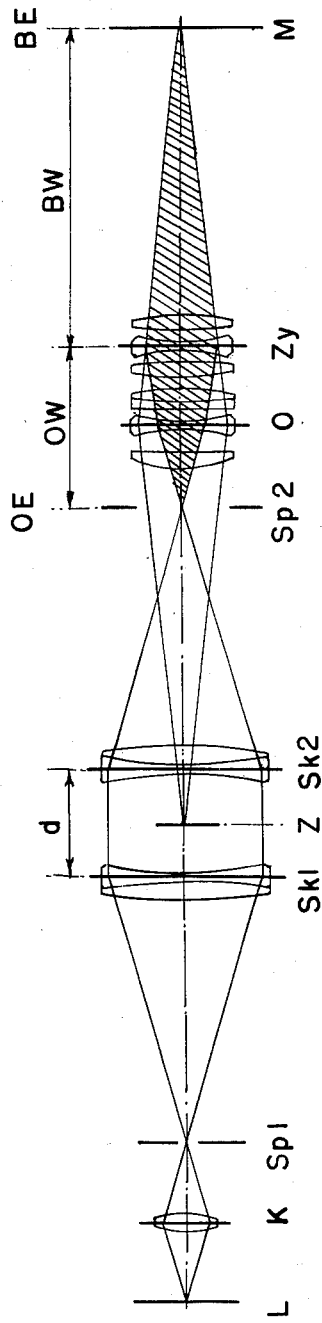
Figure 2:
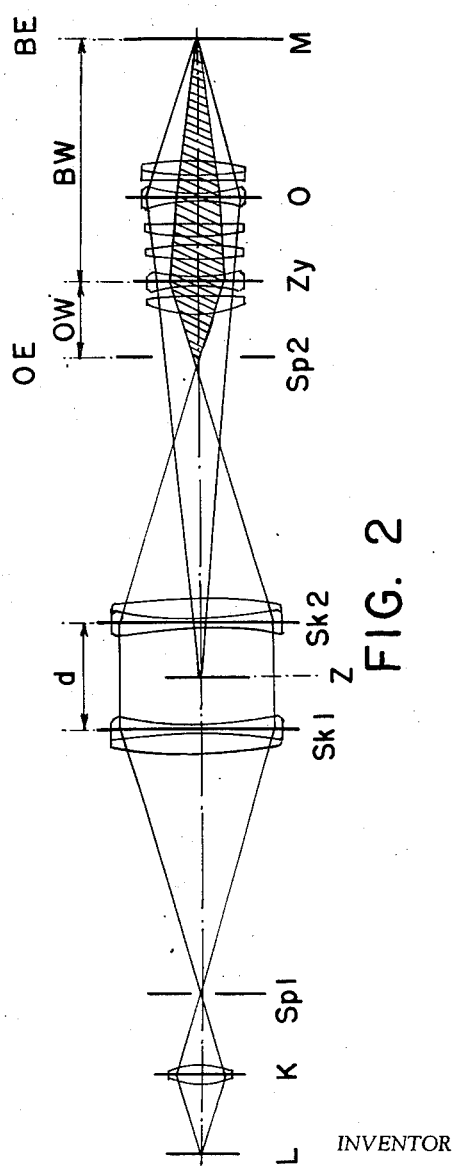

To facilitate the understanding thereof, the invention is hereinafter described with reference to the accompanying sheet of drawings, wherein:

Fig. 1 represents, in diagrammatic manner, a known system of the general type here involved; and Fig. 2 represents diagrammatically the relationship of parts according to the present invention.

Corresponding parts bear corresponding reference characters in the two figures of drawing.

The optical system shown in Fig. 1 is of the type described in the literature [see e. g. E. Wiedemann, Helv. Chimica Acta 30, 639 (1947); H. Svensson, Acta Chem. Scand. 3, 1170 (1949)]. The advantage of the new arrangement shown in Fig. 2 is that, while possessing a relatively short overall optical length, it can nevertheless also be employed for interferometric patterns according to the Rayleigh principle.

In Fig. 1, L designates the light source, K is a condenser lens, $SP_1$ is a first horizontal slit, $SK_1$ is a first schlieren lens, Z is the object (cell), $SK_2$ is a second schlieren lens, $SP_2$ is a second slit (rotatable), O is the objective (projecting an image of the cell Z in the vertical plane on the image receiving surface M), ZY is a cylinder lens having a vertical axis (projecting an image of the second slit $SP_2$ in the horizontal plane on the screen M), and M is a ground glass screen or film (plane of image).

The optical system shown in Fig. 1 operates as follows: By means of the schlieren lenses $SK_1$ and $SK_2$, between which is situated the object Z, an image of the first slit $SP_1$, illuminated by the light source L, is produced in the plane of the second slit $SP_2$. ($SK_1$ and $SK_2$ can also be replaced by single schlieren lenses.) The objective O serves to project an image of the object Z in the vertical plane on to the image receiving surface M, while the cylinder lens ZY projects an image of the second slit $SP_2$ in the horizontal plane on to the image receiving surface M. By this simultaneous projection of the two images on to the image receiving surface M it is possible to make a diagram recording in one of the forms mentioned in the first paragraph, showing the changes in refractive index with the height of the object Z (see e. g. E. Wiedemann, Helv. Chim. Acta 30, 639 (1947); E. Wiedemann, Scientia pharm. 17, 45 (1949) and the literature there cited).

The same optical system, but with the first slits placed vertically and the second slit removed, can also be used for interferometric recording of refractive index gradients according to the Rayleigh principle [see H. Svensson, Acta Chem. Scand. 31, 1170 (1949)]. An advantage of this arrangement is that it enables any one of the methods of recording mentioned to be employed at will, without affecting the size of the image.

On the other hand, the said optical system has the disadvantage that its overall optical length (the distance LM in the diagram) is considerable and in all hitherto known models has amounted to at least 3500 mm., but has generally been even longer. The overall optical length can be reduced by shortening the focal length of the schlieren lenses $SK_1$ and $SK_2$; this procedure cannot be carried beyond a certain limit, however, since, on the one hand, the diameters of the lenses must be at least as great as the height of the object, and on the other, the schlieren lenses $SK_1$ and $SK_2$ must have a very high correction which does not allow the aperture ratio to exceed 1:10. The minimum distance between slits $SP_1$ and $SP_2$ then amounts to 1200 mm. plus the distance between the schlieren lenses $SK_1$ and $SK_2$ which, in the most favourable instances, amounts to 30 mm. but is generally greater. The overall optical length is thus reduced in this way to a little more than 2000 mm.

Experience has shown, however, that if optical systems of the type shown in Fig. 1 are reduced to the above overall optical length, it is no longer possible to carry out interferometric recording by the Rayleigh method, since in the most common practically occurring cases the distance between the two interfering bundles of rays at the position of the object Z cannot be further reduced to correspond to the decrease in the focal lengths of the schlieren lenses. Consequently, it is no longer possible to achieve the necessary degree of resolution in the interference diagram, i. e. the distance between the (vertical) interference bands is not sufficiently large.

The present invention enables the necessary degree of resolution to be achieved, especially the distance between the bands in the interference diagram to be made sufficiently large, even when the overall optical length is reduced in the manner described above. Provided that the degree of correction of the optical system is sufficiently high, this can be accomplished without further reducing the distance between the two interfering bundles of rays at object Z if the image of the interference diagram primarily produced in the plane of the second slit $SP_2$ is projected on to the image receiving surface M with sufficiently great lateral magnification. In this way, it is possible to make interference patterns according to the Rayleigh principle even with an overall optical length of little more than 2000 mm.

The invention consists in increasing the power of the cylinder lens ZY of the triplet type to such a degree that, as shown in Fig. 2, it has to be placed before the objective O, viewed in the direction of the beam of light.

In each of the Figs. 1 and 2, OE designates the plane of the object, BE the plane of the image receiving surface (which coincides with the plane of the image receiving surface which may be a screen or film) while OW is the distance of the object and BW the distance of the image from the cylinder lens ZY (corresponding to $u$ and $v$ in the equation of this lens).

While the known optical system shown in Fig. 1 does not permit the ratio $OW/BW$ to be increased much above 1:2, the system designed according to the present invention (Fig. 2) makes possible almost any desired increase in this ratio, from 1:3 upwards. Consequently, almost any desired lateral magnification is possible, the only limiting factor for a given type of cylinder lens being the gradual decrease in the sharpness of the image.

An optical system having the advantages claimed for the present invention may be built using lenses having the following essential characteristics:

Condenser lens K _____ $f=8$ cm.
Schlieren lenses $SK_1$ and $SK_2$ _____ relative opening $1:10$, $f=65$ cm.
Cylinder lens ZY _____ $f=12$ cm.
Objective O _____ $f=40$ cm.
$OW/BW$ of the cylinder lens ZY _____ $1:4$.
Distance $d$ between schlieren lenses ____ 30 cm.
Overall optical length from light source to image receiving surface _____ 2150 mm.

Having thus disclosed the invention, what is claimed is:

An opetical system for measuring and recording refractive indices and gradients thereof in a test object, comprising a light source, a first slit, two collimating lenses, one on either side of the test object, the first for collimating light from the source to illuminate the test object with parallel light rays, and the second for focusing the light coming out of the test object, a second and rotatable slit, a cylinder lens of the triplet type which produces a lateral magnification not less than 3, an objective lens and an image receiving surface the overall optical length of the said optical system being less than 2500 mm. for a height of the object of at least 65 mm., whereby the said measuring and recording may be carried out by the Toepler method and their modern variants such as the direct diagram, the Philpot diagram and the wire diagram as well as by the Rayleigh interferometric method, in the latter case without reducing the lateral distance between the interference fringes to less than 0.24 mm. while maintaining a lateral distance of at least 6 mm. between the interfering bundles, measured in the vertical plane of the object.

References Cited in the file of this patent

FOREIGN PATENTS 355,911    Great Britain _____ Sept. 3, 1931